United States Patent [19]

Price et al.

[11] Patent Number: 4,474,006
[45] Date of Patent: Oct. 2, 1984

[54] METHOD AND APPARATUS FOR IMPROVED COMPRESSION RELEASE ENGINE RETARDING IN A TURBOCHARGED INTERNAL COMBUSTION ENGINE

[75] Inventors: Robert B. Price, Manchester; David E. Boyden, Granby, both of Conn.

[73] Assignee: The Jacobs Mfg. Company, Bloomfield, Conn.

[21] Appl. No.: 428,992

[22] Filed: Sep. 30, 1982

[51] Int. Cl.³ .......................................... F02B 37/12
[52] U.S. Cl. .................................................. 60/602
[58] Field of Search ................. 60/600, 601, 602, 603; 123/323; 415/205

[56] References Cited

U.S. PATENT DOCUMENTS

| | | | |
|---|---|---|---|
| 2,247,151 | 6/1941 | Clarke | 60/602 X |
| 2,838,907 | 6/1958 | Cowland | 60/602 |
| 3,137,477 | 6/1964 | Kofink . | |
| 3,220,392 | 11/1965 | Cummins | 123/97 |
| 3,270,495 | 9/1966 | Connor | 60/602 |
| 3,313,518 | 4/1967 | Nancarrow . | |
| 3,423,926 | 1/1969 | Nancarrow et al. | 60/602 |
| 3,557,549 | 1/1971 | Webster | 60/602 |
| 3,559,397 | 2/1971 | Navarro | 60/602 |
| 3,614,259 | 10/1971 | Neff | 415/205 |
| 3,975,911 | 8/1976 | Morgulis et al. | 60/602 |
| 4,008,572 | 2/1977 | Woollenweber | 60/602 |
| 4,054,156 | 10/1977 | Benson | 137/630.12 |
| 4,395,884 | 8/1983 | Price | 60/602 |

FOREIGN PATENT DOCUMENTS

| | | | |
|---|---|---|---|
| 2151658 | 4/1973 | Fed. Rep. of Germany | 60/602 |
| 2820941 | 11/1978 | Fed. Rep. of Germany | 60/602 |
| 3008180 | 9/1981 | Fed. Rep. of Germany | 60/602 |
| 44421 | 4/1981 | Japan | 60/602 |
| 113015 | 9/1981 | Japan | 60/602 |

Primary Examiner—Michael Koczo
Attorney, Agent, or Firm—Donald E. Degling

[57] ABSTRACT

An improved method and apparatus for a compression release engine retarder is disclosed. The method and apparatus are used in conjuction with a supercharged internal combustion engine fitted with a compression release engine retarder and a supercharger employing a divided volute exhaust gas turbine. A diverter valve is located between the exhaust manifold of the engine and the exhaust gas turbine. Upon actuation of the compression release engine retarder, all of the exhaust gas (or air) passing through the exhaust manifold is diverted to the portion of the divided volute of the turbine which is closest to the turbine wheel flange and, within that portion to the divided volute, to the region closest to the center of rotation of the turbine wheel.

12 Claims, 10 Drawing Figures

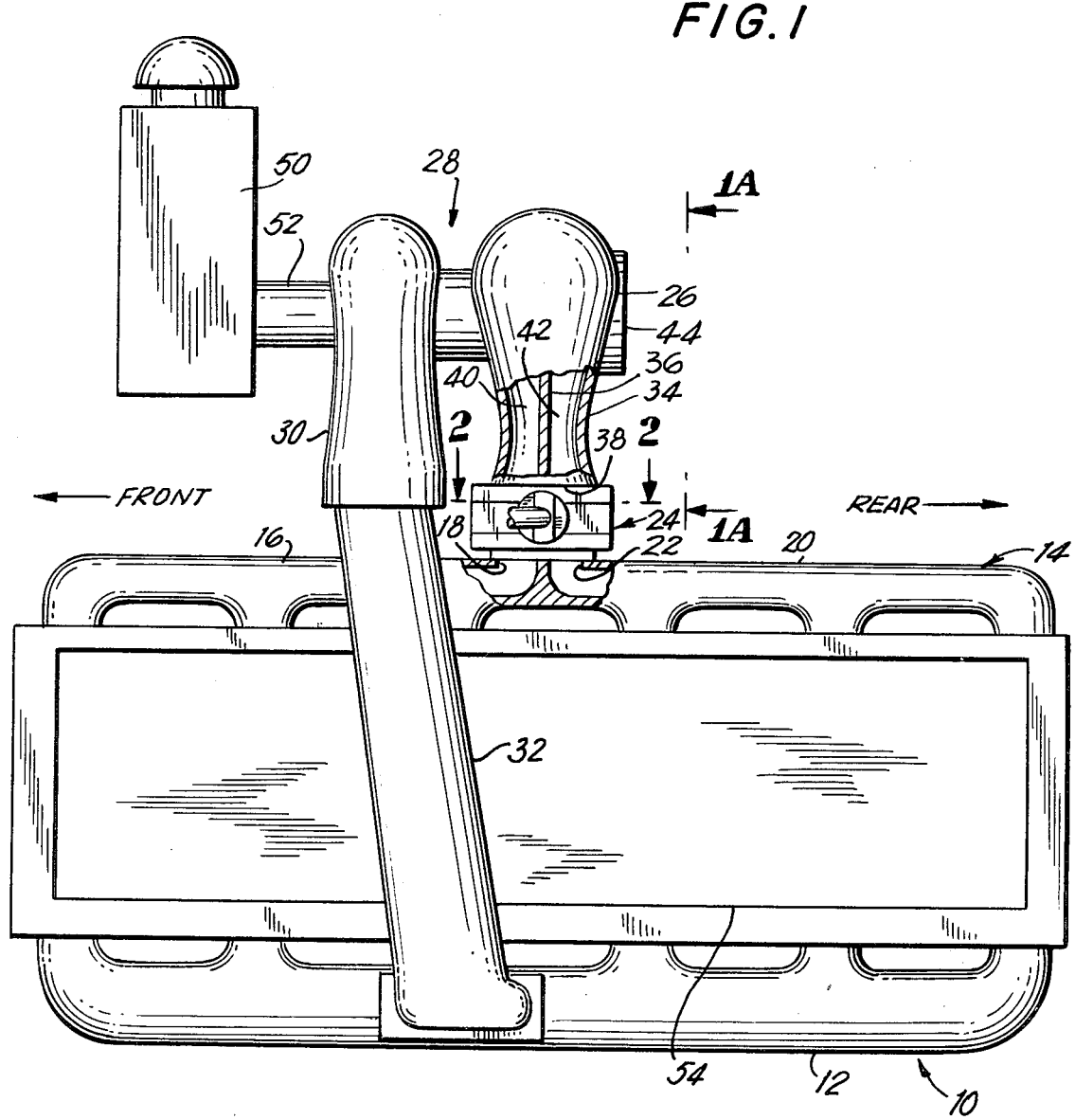
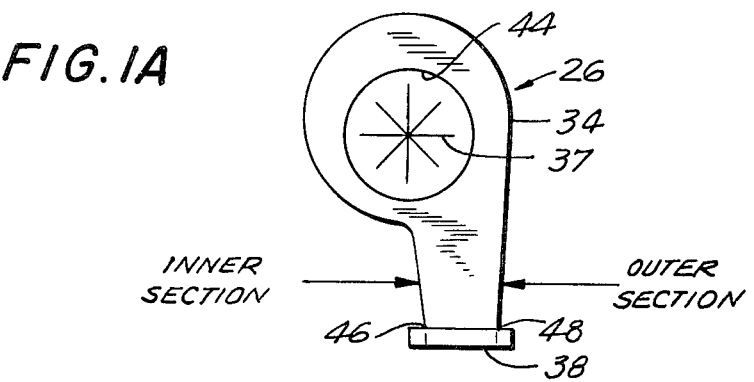

DIVERTER PORT LOCATION

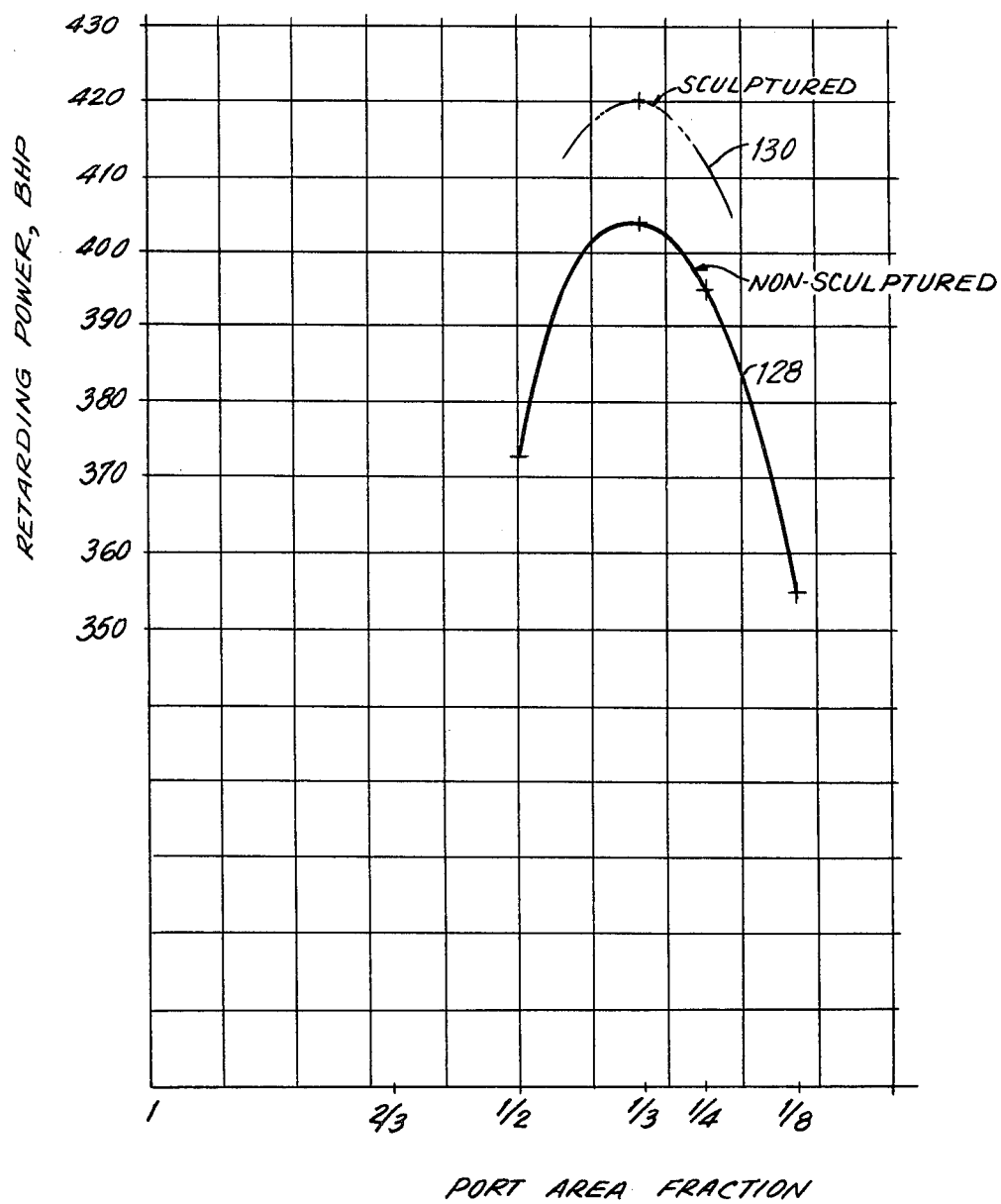

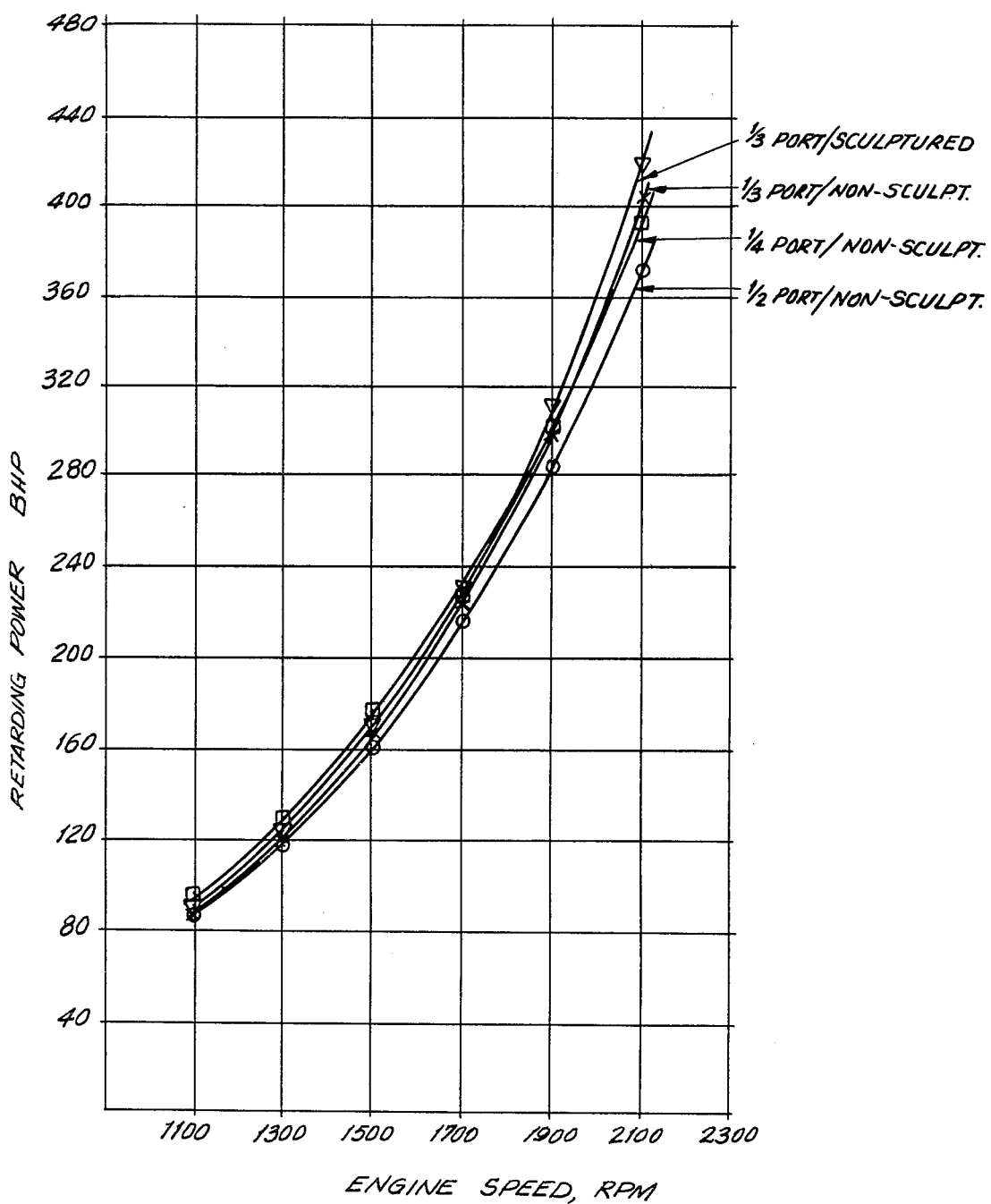

METHOD AND APPARATUS FOR IMPROVED COMPRESSION RELEASE ENGINE RETARDING IN A TURBOCHARGED INTERNAL COMBUSTION ENGINE

BACKGROUND OF THE INVENTION

1. Field of the Invention

This invention relates generally to an improved engine retarding system of the compression release type. More particularly, the invention relates to a turbocharged internal combustion engine equipped with a compression release retarder wherein the turbocharger comprises a double entry turbine together with an improved diverter valve and the method of operating such apparatus to provide improved engine retarding and improved engine performance.

2. The Prior Art

The problem of providing adequate and reliable braking or retarding for vehicles, particularly large tractor-trailer vehicles is well known. When such vehicles are operating at normal highway speeds they possess a very large momentum, and this may be increased substantially when the vehicle begins to accelerate down a long decline. While the normal drum or disc type wheel brakes are capable of absorbing a large amount of energy over a short period of time, the absorbed energy is transformed into heat which rapidly raises the temperature of the braking mechanism to a level which may render ineffective the braking surfaces and other parts of the mechanism. Repeated use of the wheel brakes under these conditions is impracticable and, therefore, resort has been made to auxiliary retarding devices.

Such auxiliary devices include hydraulic or electrodynamic retarding systems wherein the kinetic energy of the vehicle is transformed by fluid friction or magnetic eddy currents into heat which may be dissipated through appropriate heat exchangers. Other auxiliary retarding systems include exhaust brakes which inhibit the flow of exhaust gases through the exhaust system and compression release mechanisms wherein the energy required to compress the intake air during the compression stroke of the engine is dissipated by exhausting the compressed air through the exhaust system. With respect to the exhaust brake, a portion of the kinetic energy of the vehicle is dissipated through the engine cooling system. With the engine compression release retarder a portion of kinetic energy of the vehicle is dissipated as heat through the engine cooling system while another portion of the kinetic energy is dissipated in the form of hot air through the engine exhaust system.

One principal advantage of the engine compression release retarder and the exhaust brake over hydraulic and electrodynamic retarders is that both of the latter retarders require dynamos or turbine equipment which may be bulky and expensive in comparison with the mechanism required for the usual exhaust brake or engine compression release retarder. A typical engine compression release retarder is shown in the Cummins U.S. Pat. No. 3,220,392 while a typical exhaust brake is disclosed in Benson U.S. Pat. No. 4,054,156.

The concept of supercharging an engine in order to increase the mass flow of air has long been established in the art for both land vehicles and aircraft. Such supercharging is frequently accomplished by means of a turbocharger comprising an exhaust gas turbine coupled with a centrifugal compressor. While various types of turbines may be employed, a vaneless radial in-flow turbine is most commonly used for automotive turbochargers. In such a turbine it may be desirable to provide a divided volute for considerations of performance and fuel economy. In such a divided volute, it would then be possible to direct the exhaust gas flow to one or both scrolls of the volute as desired. Such a construction is shown in Webster U.S. Pat. No. 3,557,549, Neff U.S. Pat. No. 3,614,259, Clarke U.S. Pat. No. 2,247,151, Cowland U.S. Pat. No. 2,838,907, Connor U.S. Pat. No. 3,270,495, and Nancarrow U.S. Pat. No. 3,423,926. Where a divided volute turbine is used, it is necessary to provide means to direct the gas flow to one or both scrolls of the volute. The patents cited immediately above disclose various forms of diverter mechanisms for this purpose. Additional diverter valves are shown in Woollenweber, Jr. U.S. Pat. No. 4,008,572, Navarro U.S. Pat. No. 3,559,397, Kofink U.S. Pat. No. 3,137,477, Nancarrow U.S. Pat. No. 3,313,518, and Morgulis U.S. Pat. No. 3,975,911.

As disclosed in various of the patents cited above, the volume of exhaust gas available to drive the turbine of the turbocharger varies with the engine speed and engine throttle settings. A decrease in exhaust gas volume results in a decrease in the gas velocity at the turbine nozzles and a reduced turbine efficiency as well as reduced speed. It has been found desirable, in order to improve the efficiency of the turbine at low exhaust gas flow rates, to divert all of the exhaust gas to one scroll of the turbine or to selected inlet nozzles so as to maintain the gas velocity at as high a level as possible at the entry to the turbine wheel. As shown in the Webster U.S. Pat. No. 3,557,549 and the Neff U.S. Pat. No. 3,614,259, for example, a diverter valve of the flapper type directs exhaust gas into one or both scrolls of the divided volute of the turbine. In the Clarke U.S. Pat. No. 2,247,151 sequentially actuated diverter valves direct the exhaust gas into various segments of the turbine. Another approach is represented by the Kofink U.S. Pat. No. 3,137,477 which discloses the concept of changing the number of nozzles through which the exhaust gas flows.

The concept of employing a turbocharged engine equipped with a double entry turbine and a compression release engine retarder in combination with a diverter valve to direct the flow of air through one scroll of the divided volute of the turbine during an engine retarding mode of operation is disclosed in U.S. application Ser. No. 407,642 filed Aug. 12, 1982 (now U.S. Pat. No. 4,395,884) which is a continuation of application Ser. No. 238,588 which, in turn, is a continuation of application Ser. No. 21,445 filed Mar. 19, 1979 and assigned to the assignee of the present application. See also German publication O.S. 2,820,941 published Nov. 23, 1978 which discloses a combination of a turbocharged engine fitted with a compression release engine retarder. According to the German patent application the turbine is provided with a means to change the speed of the incoming gas fed to the turbine wheel.

SUMMARY OF THE INVENTION

Applicants have now discovered that both improved engine retarding and improved engine performance can be obtained by the use of an improved diverter valve in combination with an engine equipped with a compression release retarder and a turbocharger having a radial in-flow turbine provided with a divided volute.

Under conditions where engine retarding is employed, the turbocharger is used at somewhat less than its full potential due to the limited available energy from the engine retarder operation alone. Applicants, however, through use of a specially designed diverter valve, direct the flow of the available exhaust air into the turbocharger turbine so as to maximize the speed of the turbocharger and to maximize the air flow into the engine during the retarding operation. Applicants have discovered that with the turbine speed maximized, the inlet manifold pressure is also maximized, thereby maximizing retarding horsepower developed by the engine. This is achieved by diverting air flow from the rear scroll to the front scroll of the turbine, i.e. the scroll nearest the turbine wheel flange. Within this region applicants have further discovered that the turbine speed may be maximized by directing the air flow toward the innermost portion of the turbine volute i.e. the portion closest to the center of rotation of the turbine wheel. Applicants have still further discovered that the size of the orifice should be reduced to about 15 to 50 per cent of the normal opening of the port leading to the turbine and that the diverter valve member should be sculptured so as to form a smooth entry into the port of the diverter valve.

The combination of a turbocharged engine having a divided volute turbine and a specially designed diverter valve provides improved retarding (1) by maximizing the flow of air into the engine upon which the compression release retarder may function; (2) by inhibiting the flow of air from the exhaust manifold thereby providing an exhaust braking effect and (3) by increasing the temperature of air within the engine thus increasing the internal energy of the air upon which the engine is performing work. By maintaining the turbocharger at a higher operating speed the engine is capable of a positive power response immediately following the cessation of retarding while decreasing the smoke emission which results from an over-rich fuel/air mixture.

DESCRIPTION OF THE DRAWINGS

Additional advantages of the novel combination according to the present invention will become apparent from the following detailed description of the invention and the accompanying drawings in which:

FIG. 1 is a top plan view, partly in section, of an internal combustion engine having a compression release retarding mechanism, a turbocharger including a twin entry or divided volute turbine and a specially designed diverter valve in accordance with the present invention;

Figure 1A is a view of the turbine portion of the turbocharger taken along line 1A—1A of FIG. 1.

FIG. 8 is a graph showing the variation in the retarding horsepower resulting from a change in the shape and size of the diverter valve port.

FIG. 9 is a graph showing the effect on the retarding horsepower produced at various engine speeds of changes in the shape and size of the diverter valve port.

DETAILED DESCRIPTION OF THE INVENTION

Figure 4:
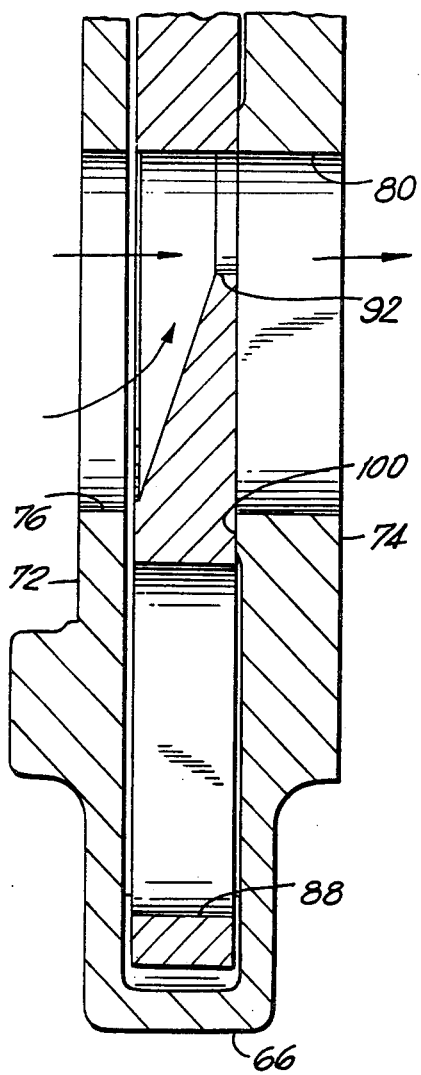
FIG. 4 is a fragmentary enlarged vertical cross-sectional view of the diverter valve mechanism taken along line 4—4 of FIG. 2.

Referring now to FIG. 1 an internal compression engine of the spark ignition or compression ignition type is indicated by the designator 10. While the engine 10 may have any number of cylinders the present invention will be illustrated and described in connection with a typical compression ignition engine having six cylinders equipped with an intake manifold 12, and a divided exhaust manifold 14 comprising a front portion 16, having an outlet port 18 and a rear portion 20 having an outlet port 22.

The exhaust manifold outlet ports 18 and 22 communicate with a diverter valve 24 which, in turn, communicates with the exhaust gas turbine 26 of the turbocharger 28. In addition to the turbine 26, the turbocharger 28 comprises a coaxial compressor 30 directly driven from the turbine 26. A duct 32 communicates between the outlet of the compressor 30 and the inlet manifold 12. The turbocharger 28 employs a radial flow type of exhaust gas turbine 26 fitted with a divided volute 34 and a radial flow centrifugal compressor 30. The turbine 26 is shown in side view in FIG. 1A. The turbine volute 34 is typically divided by a partition 36, generally normal to the axis of rotation of the turbine wheel 37, which partition extends to the entry end 38 of the turbine so as to define a front scroll 40 and a rear scroll 42 of the turbine volute 34. The turbine near the entry end 38 may be defined as having an inner section 46 and an outer section 48 where the inner section 46 is that portion closer to the center of the rotation of the turbine while the outer section 48 is located away from the center of rotation of the turbine. The air or exhaust gases used to drive the turbine 26 leave the turbine through the axial exhaust port 44 which communicates with the engine exhaust system (not shown).

Air is introduced into the engine 10 through the usual air cleaner 50, compressor inlet duct 52, compressor 30, duct 32 and inlet manifold 12.

The engine 10 is also fitted with a housing 54 within which the compression release mechanism is housed. As noted above, the compression release mechanism opens an exhaust valve of a cylinder near the end of the compression stroke of that cylinder whereby the work done in compressing air during the compression stroke is not recovered during the ensuing expansion stroke but is dissipated through the engine exhaust and cooling systems. Typically, the compression release mechanism is arranged to operate on each cylinder of the engine for maximum retarding effect though it may operate on fewer than all of the cylinders, if desired.

The compression release mechanism is described in detail in the Cummins U.S. Pat. No. 3,220,392 and inter alia in the Sickler, et al. U.S. Pat. No. 4,271,796. Further description of the compression release mechanism itself is not required here.

Figure 2:
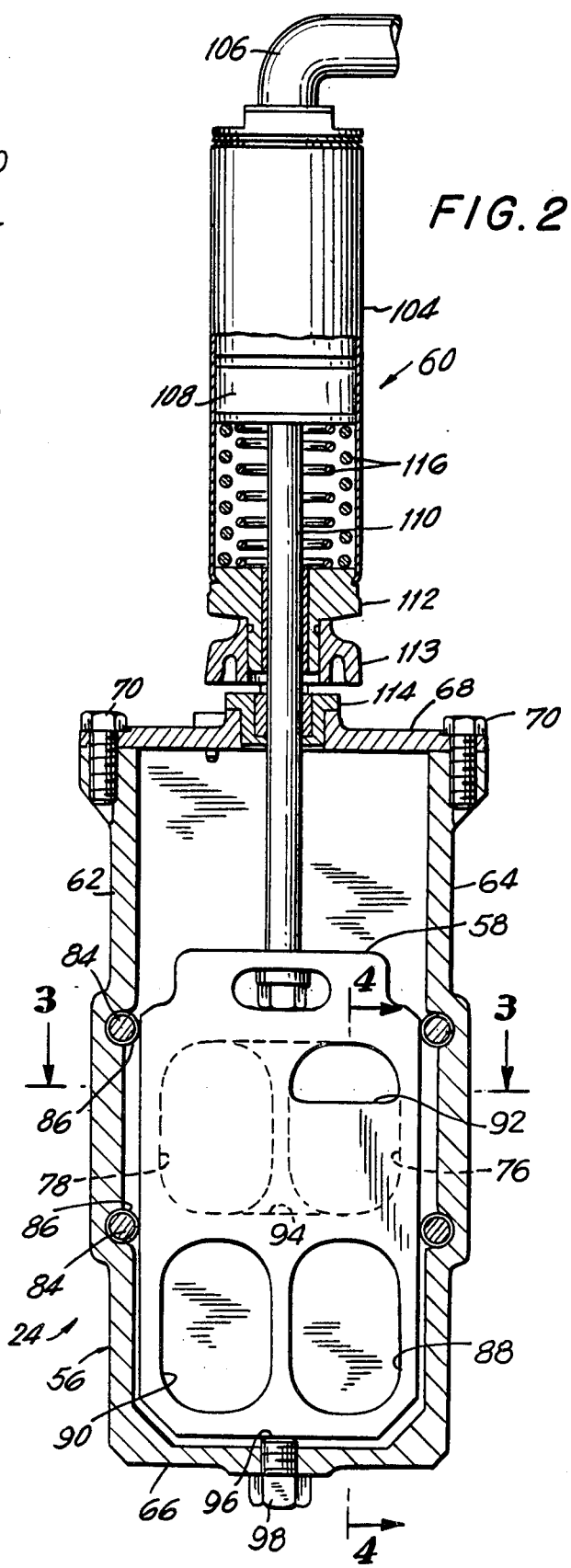
FIG. 2 is a view, partly in section, of an exhaust gas diverter valve mechanism taken along lines 2—2 of FIG. 1 showing the diverter mechanism in the actuated or "on" position.
Figure 6:
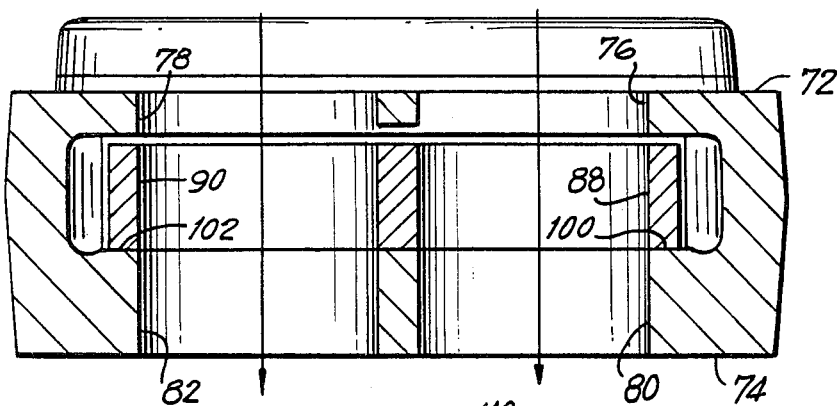
FIG. 6 is an enlarged cross-sectional view of the diverter valve mechanism taken along line 6—6 of FIG. 5.

Reference is now made to FIGS. 2-6 and particularly FIG. 2 which depicts applicants' diverter valve 24 and its actuating mechanism. The diverter valve 24 comprises a housing 56 within which a sliding valve body 58 is located and an hydraulic or pneumatic actuator 60 for the sliding valve body 58. The housing 56 is generally of rectangular shape in its vertical cross section and comprises solid side portions 62, 64 and a solid bottom or end portion 66. The upper end of the housing 56 is closed by a removable cap 68 fastened to the housing 56 by cap screws 70. The housing 56 also comprises an exhaust manifold face 72 (FIG. 4) and a turbine face 74 which are respectively juxtaposed adjacent the exhaust manifold 14 and the turbine entry 38. Inlet ports 76 and 78 are formed in the exhaust manifold face 72 of the housing 56 so as to register respectively with the outlet ports 18 and 22 formed in the exhaust manifold 14. Similarly outlet ports 80 and 82 are formed in the turbine face 74 of the housing 56. Outlet ports 80 and 82 are aligned respectively with inlet ports 76 and 78 and communicate respectively with the front scroll 40 and the rear scroll 42 of the turbine volute 34. The diverter valve housing 56 is fastened between the turbine 26 and the exhaust manifold 14 by cap screws 84 which are threaded into the exhaust manifold 14. Bushings 86 are positioned coaxially with the cap screws 84 within the housing 56 to guide the sliding valve body 58.

The sliding valve body 58 is generally rectangular in shape and has formed therein a pair of orifices 88 and 90. When the valve body 58 is in its upward or deactuated position (FIGS. 5 and 6), orifice 88 registers with port 76 and 80 and orifice 90 registers with ports 78 and 82 thereby providing an uninterrupted path for the flow of air or exhaust gases from the exhaust manifold 14 into the front scroll 40 and rear scroll 42 of the turbine volute 34 without throttling or expansion of the air or exhaust gases flowing into the turbine volute.

At the opposite end of the sliding valve body 58 a single orifice 92 is formed. Orifice 92 is designed to communicate between inlet ports 76 and 78 and outlet port 80 when the sliding valve body 58 is in the position as shown in FIG. 2. The area of orifice 92 is between 15 and 50 percent (and preferably about one third) of the area of ports 76 or 80. As described in more detail below, orifice 92 is aligned with the inner section 46 of the front portion 40 of the turbine volute. As suggested by numeral 94 in FIGS. 2 and 5 and as shown in more detail in FIGS. 3 and 4, the surface of the valve body 58 which faces the exhaust manifold side of the diverter volute housing 56 is "sculptured" or faired in the area adjacent ports 76 and 78 to direct the flow of exhaust gas (or air) through the restricted area of orifice 92 as smoothly as possible.

An adjustable stop 96 and locknut 98 may be located in the bottom end wall 66 of the housing 56 to locate accurately the actuated or "on" position of the sliding valve body 58. As best shown in FIG. 4 a boss 100 is formed around the periphery of port 80 and a boss 102 (FIGS. 3 and 6) is formed around the periphery of port 82. The bosses 100 and 102 provide a seat against which the valve body 58 may slide and, when the diverter valve 24 is actuated, a seal to inhibit the flow of exhaust gas (or air) through the port 82. The sealing action of the valve body 58 against the bosses 100, 102 results from the force of the exhaust gas against the sculptured portion of the valve body. Since sealing action is provided by the bosses 100, 102 a substantial clearance may be provided between the valve body 58 and the inside surface of the housing 56. This clearance is shown in FIGS. 2 through 6 and assures easy action of the diverter valve despite large temperature changes which occur in the various parts under normal operating conditions and which result in dimensional changes in the parts of the diverter valve 24.

Figure 5:
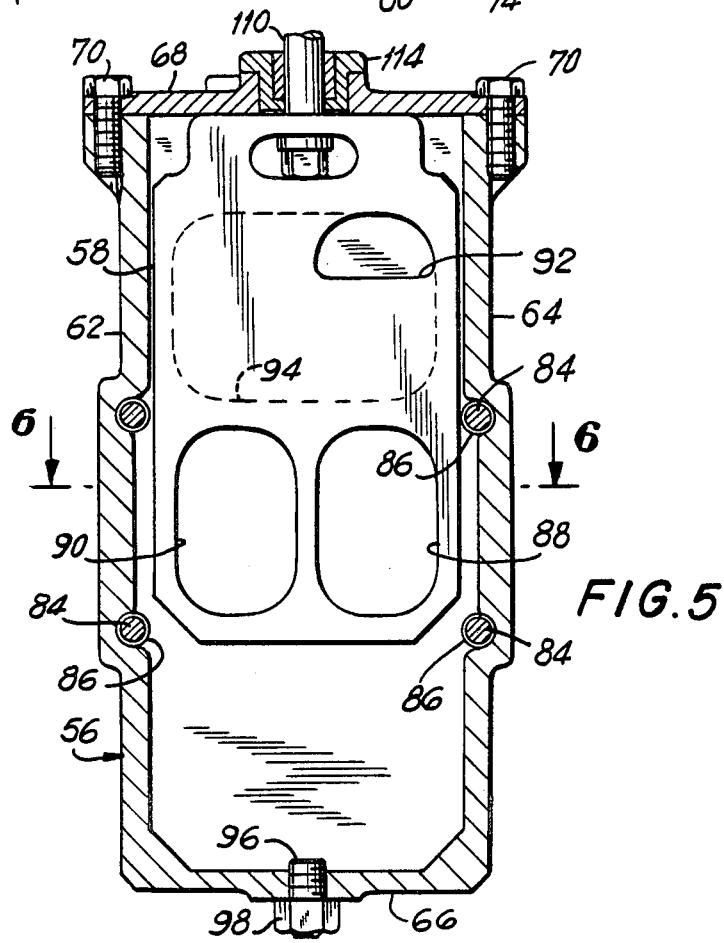
FIG. 5 is a fragmentary sectional view of the exhaust gas diverter valve mechanism taken along line 2—2 of FIG. 1 but showing the diverter mechanism in the deactuated or "off" position.
Figure 3:
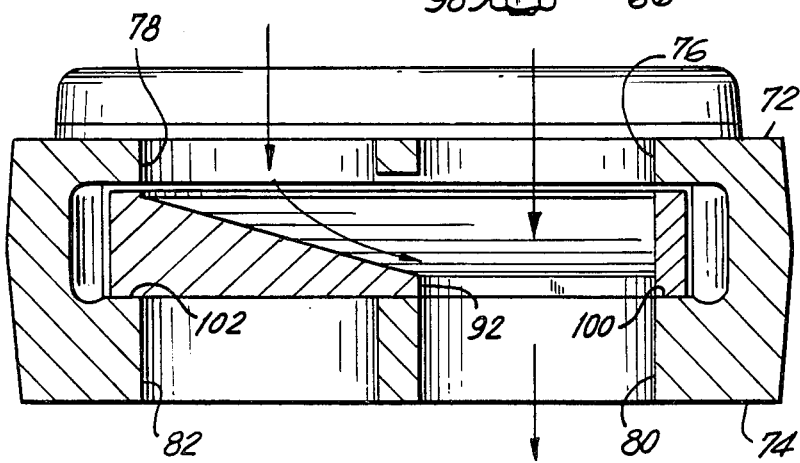
FIG. 3 is an enlarged cross-sectional view of the diverter valve mechanism taken along line 3—3 of FIG. 2.
Figure 7:
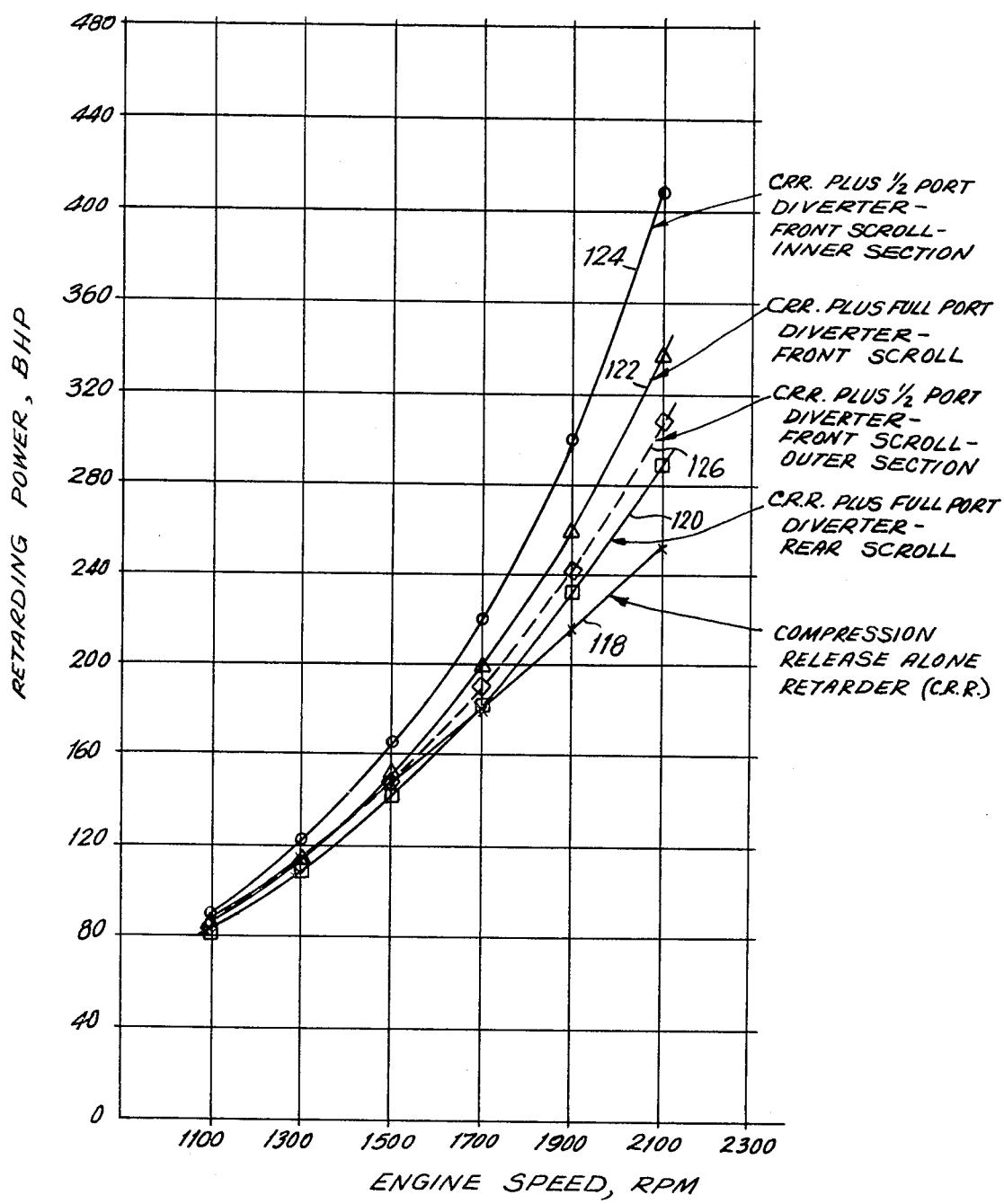
FIG. 7 is a graph showing the variation in retarding horsepower resulting from a change in the location of the diverter valve port.

As shown in FIG. 2, an hydraulic or pneumatic actuator 60 is provided to control the position of the sliding valve body 58. The actuator 60 comprises an hydraulic or pneumatic cylinder 104 and a duct 106 leading to a controlled source of pressurized hydraulic or pneumatic fluid (not shown). A piston 108 is located within the cylinder 104 and is connected by a piston rod 110 to the sliding valve body 58. The end of the cylinder 104 through which the piston rod 110 passes may be closed by a cap 112 which may be threaded into an adaptor bracket 113 which in turn is fastened to the housing cap 68 by cap screws (not shown). A sealing gland 114 is located in the housing cap 68 coaxially with the piston rod 110 to prevent leakage of exhaust gases (or air) from the housing 56. Spring means 116 are located within the cylinder 104 and between the piston 108 and cap 112 to bias the piston 108 and the sliding valve body 58 in an upward direction. Thus, the diverter valve 24 normally is in the deactuated or "off" position as shown in FIG. 5. However, whenever the compression release engine retarder is actuated, pressurized hydraulic or pneumatic fluid will be directed through duct 106 into the cylinder 104 so as to drive the piston 108, piston rod 110, and sliding valve body 58 downwardly against the bias of spring means 116 until the sliding valve body 58 strikes the adjustable stop 96. FIGS. 7, 8, and 9 show the results of a series of experiments done with a Caterpillar compression ignition engine fitted with a Jacobs compression release engine retarder and a Schwitzer divided volute turbocharger. In each of FIGS. 7, 8 and 9 the retarding horsepower is the braking horsepower as measured by an electric dynamometer at various engine speeds up to the maximum speed of 2100 RPM. Curve 118 shows the retarding horsepower produced by the compression release retarder (C.R.R.) alone, i.e. with the diverter valve removed or in the deactuated or "off" position.

Curve 120 shows the improvement in retarding horsepower resulting from the diversion of all of the air flow to the rear scroll 42 of the turbine 26. It will be noted that the improvement in performance occurs principally at higher engine speeds. However, it is at these speeds that the engine retarder becomes most necessary to the operation of the vehicle.

Curve 122 shows that a substantial further improvement in retarding horsepower results from diverting the flow of air to the front scroll 40 of the turbine 26 instead of the rear scroll 42 of the turbine 26. This further improvement is of the same order of magnitude as that produced by diverting the air flow from both scrolls 40, 42 to just the rear scroll 42. Although the concept of diverting the flow into one of the two scrolls of the turbine has been described in U.S. Pat. No. 4,395,884, as noted above, the difference in retarding horsepower resulting from diversion to the front scroll (i.e. the scroll nearest the flange of the turbine wheel) is surprising and applicants are unable to explain satisfactorily the reasons for this difference.

Curve 124 shows a still further substantial improvement in retarding horsepower resulting from the diversion of the entire flow of air to the inner section 46 of the front scroll 40 of the turbine 26. Again, this increase in retarding horsepower is of about the same order of magnitude as the previous change from the rear scroll 42 to the front scroll 40. Applicants are unable to explain satisfactorily why the addition of a restriction in the air flow passage at a distance from the turbine wheel should improve retarding performance so substantially.

Finally, curve 126 shows a retrogression in retarding performance when the flow of air is diverted to the outer section 48 of the volute 34 from the inner section 46 of the volute 34.

As a result of the work reflected in FIG. 7 which was performed with flat sliding valve body through which sharp edged orifices had been formed, applicants believed that the size and shape of the orifice might also prove to be significant. As shown in FIG. 8 orifices varying from about ⅛ to about ½ of the exhaust and turbine ports 76, 78, 80 or 82 were tested. Curve 128 demonstrates that maximum retarding horsepower occurs when the orifice 92 is approximately one third the area of the ports 76 or 80. Further tests were run using a sculptured sliding valve body 58 as shown in FIGS. 2 through 5. Again, the sculptured valve body showed an improved retarding performance, perhaps related to a decrease in the frictional forces associated with the air flow through the valve body.

FIG. 9 shows the results of further tests in which both the size and shape of the port 92 were varied. In each case the port 92 was located at the inner section 46 of the front scroll 40 of the turbine 26, the position found in the earlier tests to be the most effective. The further tests showed that, at all engine speeds of significance to the retarding operation, retarding horsepower was maximized with a port 92 equal in area to about one third the area of the ports 76 or 80 and that the sculptured or shaped port was superior to the unsculptured port.

Applicants believe that the combination of a diverter valve and compression release retarder with a turbocharged engine in accordance with the present invention operates with two retarding components: first, the compression release retarder produces a retarding horsepower which is a function of the mass and energy of the air upon which the engine is operating. Second, the diverter valve itself represents a restriction in the exhaust system which acts in the manner of an exhaust brake. These two different modes of operation appear to be synergistic since the energy absorbed by the exhaust brake component increases both the exhaust manifold pressure and the temperature of the air passing through the engine. This causes an increase in the mass and energy of the air passing through the engine which, in turn, increases the efficiency of the turbine and enables the compressor to further increase the mass of the air flow through the engine. It will, of course, be appreciated that as the mass flow of air through the engine is increased, so is the work of compression and, resultantly, the retarding horsepower is increased.

There are a number of related advantages of the present invention which derive from maximizing the turbine speed and air flow during the retarding mode of operation. These advantages include a more rapid power response when the engine is returned to the fueling mode from the retarding mode. The more rapid power response results from the higher turbine speed which is capable of providing a more nearly adequate supply of air for combustion. The increased mass of air means that the fuel/air ratio at the commencement of the fueling mode is leaner and, therefore, more complete combustion of the fuel ensues. This decreases the smoke emissions, as well as the tendency of the engine to build up an internal carbon deposit.

Another advantage of the diverter valve in accordance with the present invention derives from the fact that when the compression release retarder and the diverter valve are deactuated the engine functions precisely as it would if these parts had not been present, and thus the engine performance in the fueling mode is not compromised by the equipment used to perform the retarding function.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. An engine retarding system for an internal combustion engine having an intake manifold, a divided exhaust manifold and exhaust valves comprising a compression release engine retarder including means to open at least one of the exhaust valves of said engine near the end of the compression stroke of the engine cylinder with which said exhaust valve is associated whereby the work expended in compressing air during the compression stroke of said engine cylinder is not recovered during the ensuing expansion stroke of said engine cylinder, a turbocharger comprising an air compressor communicating with said intake manifold of said engine and driven by a radial in-flow exhaust gas turbine having a bladed turbine wheel rotatable about an axis of rotation with a flange on one side thereof, said turbine having a volute comprising a front scroll and a rear scroll commencing at front and rear entry ports respectively, said front scroll being closer to said turbine wheel flange than said rear scroll, a diverter valve located exteriorly of the exhaust gas turbine and communicating on one side with said divided exhaust manifold of said engine and on the other side with said front and rear scrolls of the volute of said exhaust gas turbine, said diverter valve having three orifices formed therein and having in its deactuated position two of said orifices each substantially equal in area to the area of one of said entry ports for said front and rear scrolls aligned with said front and rear entry ports of said turbine whereby the flow of exhaust gas or air is directed from said exhaust manifold to both said front and rear scrolls of said turbine volute without throttling or expansion, said diverter valve having in its actuated position the third of said orifices having an area in the range of 15 to 50% of the area of said front entry port of said turbine volute and aligned with the area of said front entry port which is closest to the center of rotation of said turbine whereby all of the air from said exhaust manifold is diverted through said front scroll of said turbine volute, and means to actuate said diverter valve whenever said compression release engine retarder is actuated.

2. Apparatus as described in claim 1 in which said diverter valve comprises a housing having a pair of entry ports communicating with said exhaust manifold and a pair of exit ports communicating with said entry ports for said front and rear scrolls of said turbine volute, and a valve body movable between said actuated and said deactuated positions, said valve body in its deactuated position having a pair of orifices equal in area to the area of said entry ports for said front and rear scrolls of said turbine volute and aligned therewith, said valve body in its actuated position having a single orifice communicating between said divided exhaust manifold and said front scroll of said turbine volute.

3. Apparatus as described in claim 2 in which said movable valve body is in the form of a flat plate.

4. Apparatus as described in claim 3 in which the surface of said movable valve body juxtaposed to said entry ports of said diverter valve housing when said movable valve body is in its actuated position is sculptured toward said single orifice.

5. Apparatus as described in claim 2 in which said means to actuate said diverter valve comprises an hydraulic or pneumatic cylinder.

6. Apparatus as described in claim 1 in which the area of said third orifice of said diverter valve is about one third the area of the entry port of said front scroll of said turbine volute.

7. Apparatus as described in claim 2 in which the area of said third orifice of said diverter valve is about one third the area of the entry port of said front scroll of said turbine volute.

8. Apparatus as described in claim 7 in which said movable valve body is in the form of a flat plate.

9. Apparatus as described in claim 8 in which the surface of said movable valve body juxtaposed to said entry ports of said diverter valve housing when said movable valve body is in its actuated position is sculptured toward said third orifice.

10. Apparatus as described in claim 7 in which said means to actuate said diverter valve comprises an hydraulic or pneumatic cylinder.

11. A method for retarding an internal combustion engine driven vehicle equipped with an engine having a compression release engine retarder, an intake manifold, a divided exhaust manifold, a turbocharger comprising a radial in-flow exhaust gas turbine having a flanged turbine wheel rotatable about an axis of rotation and a divided volute, said divided volute comprising a front scroll and rear scroll, said front scroll located closer to the flanged side of said flanged turbine wheel than said rear scroll, and a diverter valve interposed between said divided exhaust manifold and said divided volute of said turbocharger turbine so as to be entirely exterior to said divided volute of said turbocharger turbine, comprising the steps of actuating said compression release engine retarder and simultaneously actuating said diverter valve to direct continously all of the flow of air from said divided exhaust manifold to the portion of said front scroll comprising between 15 and 50% of the cross sectional area of said first scroll of said turbine volute which is closest to the axis of rotation of said flanged turbine wheel whereby the speed of the turbine is increased and the mass flow of air through the turbocharger compressor to said intake manifold is increased, continuously inhibiting the mass flow of air from said divided exhust manifold, continuously compressing said increased mass flow of air from said turbocharger in said engine, periodically releasing said increased mass of compressed air to said exhaust manifold near the end of the compression stroke of said engine and continuously directing all of said increased mass flow of air through said diverter valve to the portion of said front scroll of said turbine volute which is closest to said axis of rotation of said flanged turbine wheel whereby the rotational speed of said turbine is further increased.

12. A method for operating an internal combustion engine driven vehicle equipped with an engine having a compression release engine retarder, an intake manifold, a divided exhaust manifold, a turbocharger comprising a radial in-flow exhaust gas turbine having a flanged turbine wheel rotatable about an axis of rotation and a divided volute, said divided volute comprising a front scroll and rear scroll, said front scroll located closer to the flanged side of said flanged turbine wheel than said rear scroll, and a diverter valve interposed between said divided volute of said turbocharger turbine so as to be entirely exterior to said divided volute of said turbocharger turbine, comprising the steps of actuating said compression release engine retarder and simultaneously actuating said diverter valve to direct continuously all of the flow of air from said divided exhaust manifold to the portion of said front scroll comprising between 15 and 50% of the cross sectional area of said front scroll which is closest to the axis of rotation of said flanged turbine wheel whereby the rotational speed of the turbocharger is increased and the mass flow of air through the turbocharger to said intake manifold is increased, inhibiting the mass flow of air from said exhaust manifold, compressing the increased mass flow of air from said compressor in said engine, periodically releasing said increased mass of compressed air to said divided exhaust manifold near the end of the compression stroke of said engine, continuously directing all of said increased mass flow of air through said diverter valve to the portion of said front scroll of said turbine volute which is closest to the axis of rotation of said flange turbine wheel, thereafter deactuating said compression release engine retarder and redirecting the mass flow of said air through both the front and rear scroll of said divided volute of said turbocharger turbine by deactuating said diverter valve.

* * * * *